United States Patent [19]

Archer et al.

[11] Patent Number: 5,038,087

[45] Date of Patent: Aug. 6, 1991

[54] APPARATUS FOR CONTROLLING WINDOW BLINDS AND AWNINGS

[75] Inventors: John N. Archer, Målilla; Sven A. S. Hakanson, Nynäshamn, both of Sweden

[73] Assignee: Ambient Energy Design OPM, Oskarshamn, Sweden

[21] Appl. No.: 466,563

[22] Filed: Jan. 17, 1990

[30] Foreign Application Priority Data

Jan. 20, 1989 [SE] Sweden ............................... 8900216

[51] Int. Cl.[5] ............................................ H02P 1/22

[52] U.S. Cl. .................................... 318/469; 318/266; 318/466

[58] Field of Search ............... 318/255, 256, 264, 265, 318/266, 434, 466, 467, 468, 469

[56] References Cited

U.S. PATENT DOCUMENTS

| | | | |
|---|---|---|---|
| 4,443,745 | 4/1984 | Seino et al. | 318/264 X |
| 4,514,670 | 4/1985 | Fassel et al. | 318/266 X |
| 4,746,845 | 5/1988 | Mizuta et al. | 318/469 X |
| 4,870,333 | 9/1989 | Itoh et al. | 318/466 X |
| 4,871,954 | 10/1989 | Rathgeber | 318/466 |
| 4,902,953 | 2/1990 | Kraft et al. | 318/469 X |

FOREIGN PATENT DOCUMENTS

| | | | |
|---|---|---|---|
| 56-71482 | 6/1981 | Japan | 318/470 |
| 2013428 | 8/1979 | United Kingdom | 318/265 |

*Primary Examiner*—Bentsu Ro

*Attorney, Agent, or Firm*—Pollock, Vande Sande and Priddy

[57] ABSTRACT

In an apparatus for controlling a D.C. motor used in the lifting and lowering operation of a window blind or an awning, pulses induced as a result of rotation of the motor rotor are used for delivering signals to a signal receiving means. The signal receiving means includes a counter for counting the induced pulses, a memory that stores the number of pulses required for the blind or awning to move between its end positions, and a comparator circuit for generating a control signal when the operating current to the motor exceeds a predetermined value, and delivers signals to stop the motor at the end positions of the blind or awning.

3 Claims, 4 Drawing Sheets

APPARATUS FOR CONTROLLING WINDOW BLINDS AND AWNINGS

BACKGROUND OF THE INVENTION

The invention relates to an apparatus for controlling window blinds of the venetian type or roller blinds or blinds made of folded material, and to awnings that are placed on the outside of a building.

Automation for window blinds is such that the blind can be raised or lowered electrically. A small electric motor usually operating through a gearbox, winds up the lifting cord or band of the blind to raise it and winds down the cord or band to lower it. A problem that arises is how the electric motor is to be stopped when the blind is fully raised or fully lowered. At present the motor is stopped by microswitches which have been built into the blind, and which open when the blind is fully up or fully down. A similar system with microswitches is used to stop the motor of an awning when the awning is fully extended or fully retracted. However such systems involve considerable difficulties with installation, are relatively expensive, tend to be unreliable and involve time consuming initial installation.

SUMMARY OF THE INVENTION

The present invention overcomes the difficulties mentioned above by using the rotation of the motor rotor for delivering signals to a signal receiving means which in turn delivers signals to stop the motor at the end positions of the blind or awning. Preferably the number of revolutions is counted and the motor is stopped after a fixed number of revolutions has been completed. When a direct current motor is running there is a small voltage or current pulse every time the sections of the rotor pass through the magnetic field of the field windings. These voltage or current pulses can be detected in the cables leading to the motor. Alternatively pulses can be detected by a small coil or sensor attached to the outside of the motor casing. However a third cable leading from the motor is then normally required.

BRIEF DESCRIPTION OF THE DRAWINGS

Embodiments of the invention are in the following with reference to the accompanying drawings described more in detail, wherein also further advantages are described.

DESCRIPTION OF THE PREFERRED EMBODIMENTS

Figure 1:
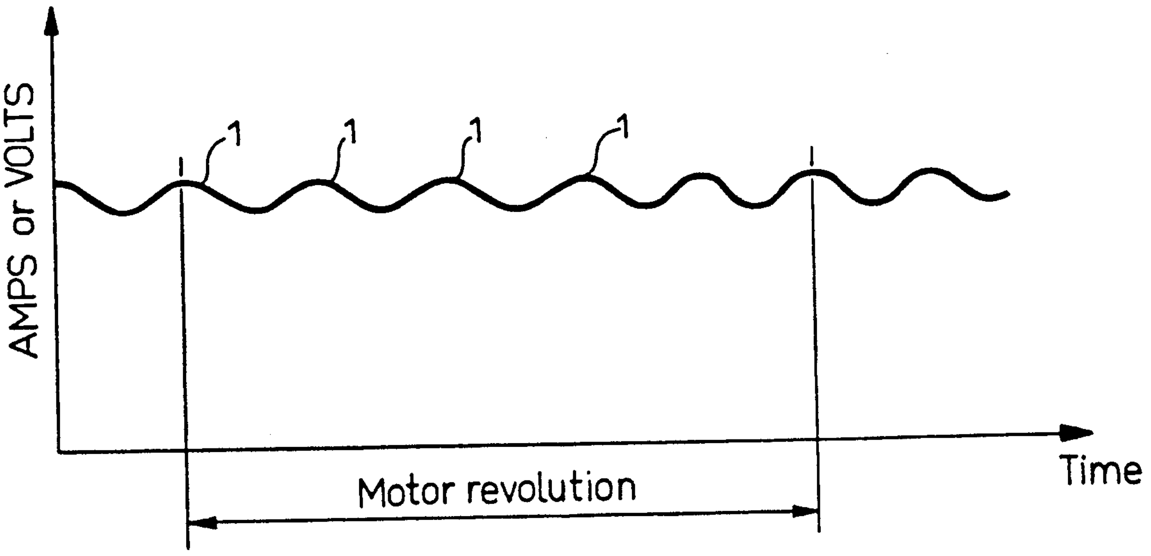
FIG. 1 shows the voltage being supplied to a direct current motor and pulses arising from the rotation of the rotor.

FIG. 1 the fluctuations voltage in voltage or current 1, that occur when the segments of the motor rotor pass through the magnetic field of the motor stator, are shown.

Figure 2:
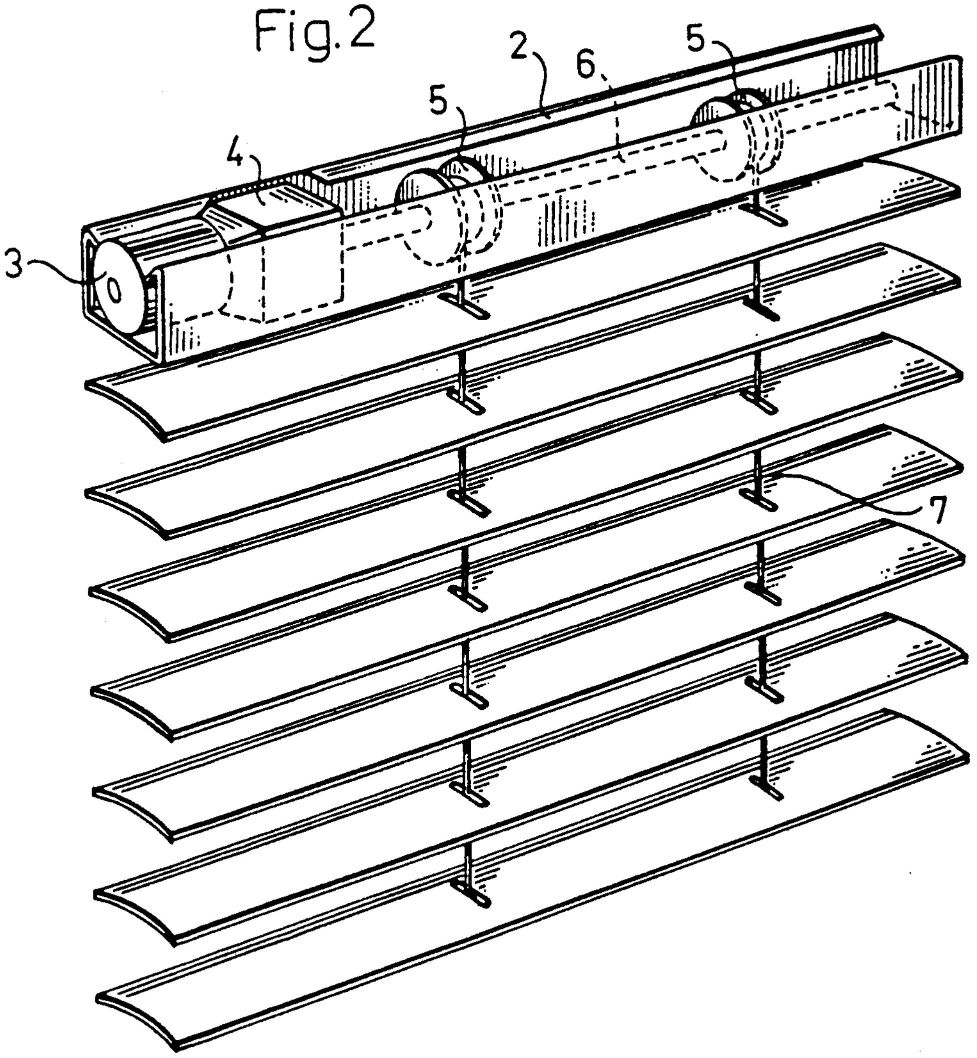
FIG. 2 shows a venetian blind with the motor and gearbox, and winding reels for the lifting cords or bands.

In FIG. 2 is shown the construction of a venetian blind with motor 3, and gearbox 4 in the top rail 2. The gearbox drives an axel 6, which turns the hubs 5, upon which the lifting cord or band 7 is wound. There may be several variations of method of winding up the lifting cord or band; however the use of a motor and gearbox turning an axel inside of the top rail and being used to wind up the lifting cords or bands is common to the designs.

Figure 3:
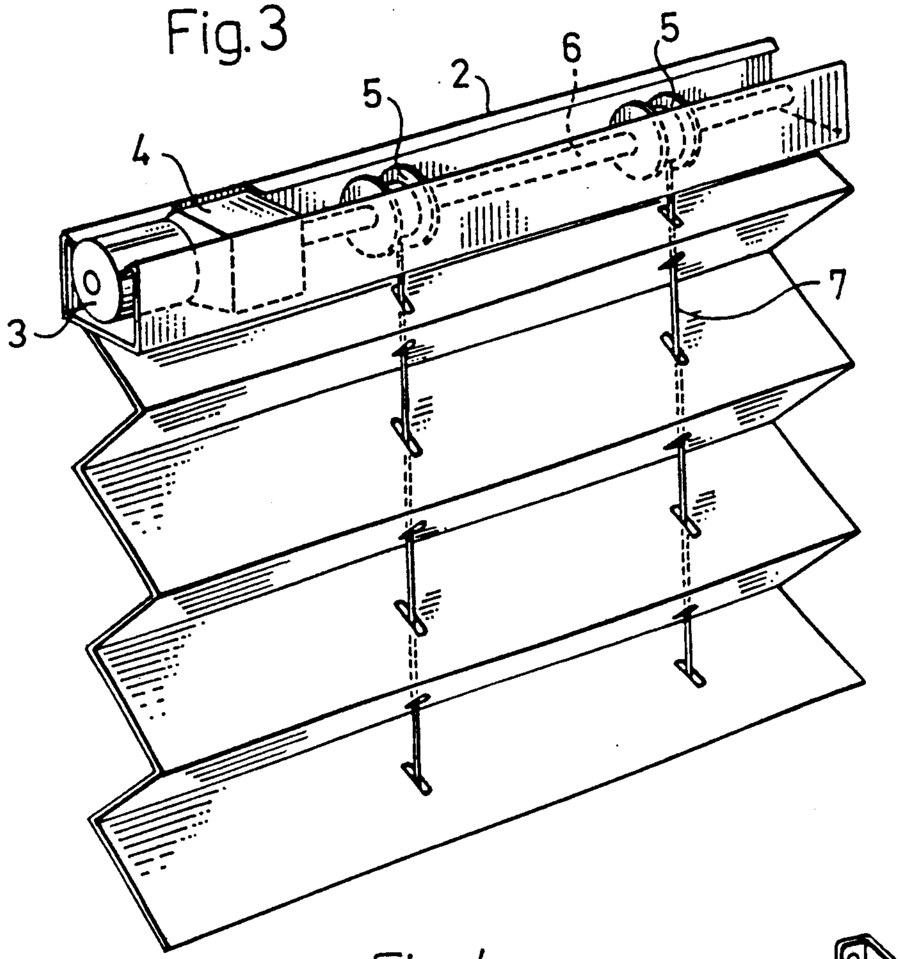
FIG. 3 shows another type of window blind with a similar winding mechanism.

In FIG. 3 the construction of a window blind made with folded material is shown. This has a top rail 2, with a motor 3, and gearbox 4, which is connected to an axle 6, which turns winding hubs 5, upon which the lifting cords or band 7, are wound. Again there may be a variation in the method of winding up the lifting cords or bands, however the use of motor, gearbox and axle is common to all methods.

Figure 4:
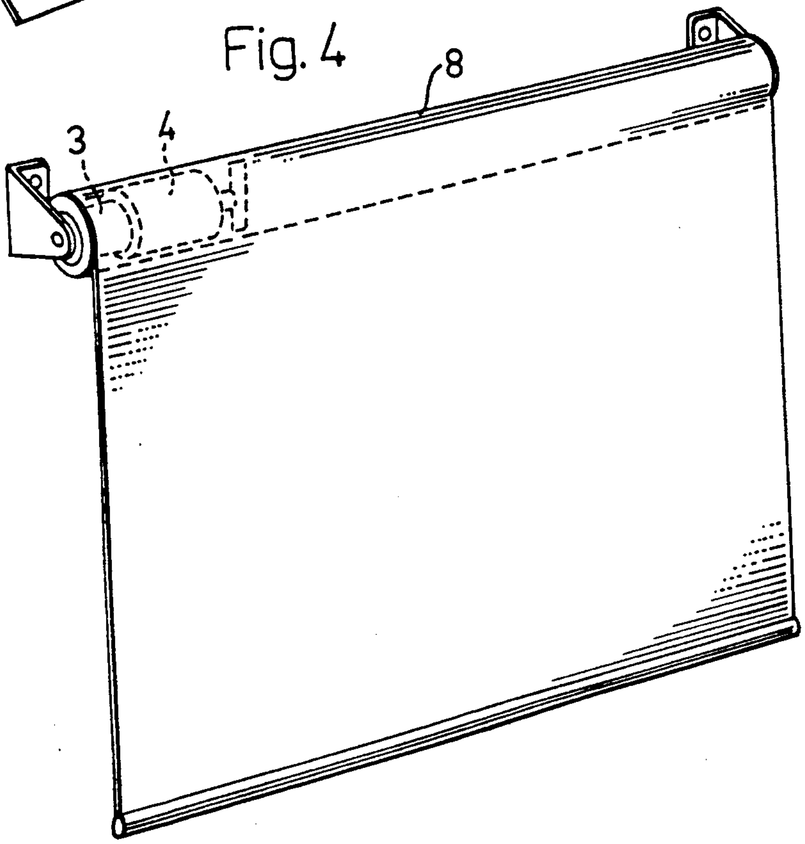
FIG. 4 shows a roller blind with its system of winding.

In FIG. 4 the construction of a roller blind is shown. This has a motor 3, and gearbox 4. The gearbox causes a tube 8 to rotate, thereby rolling the blind up or allowing it to come down.

Figure 5:
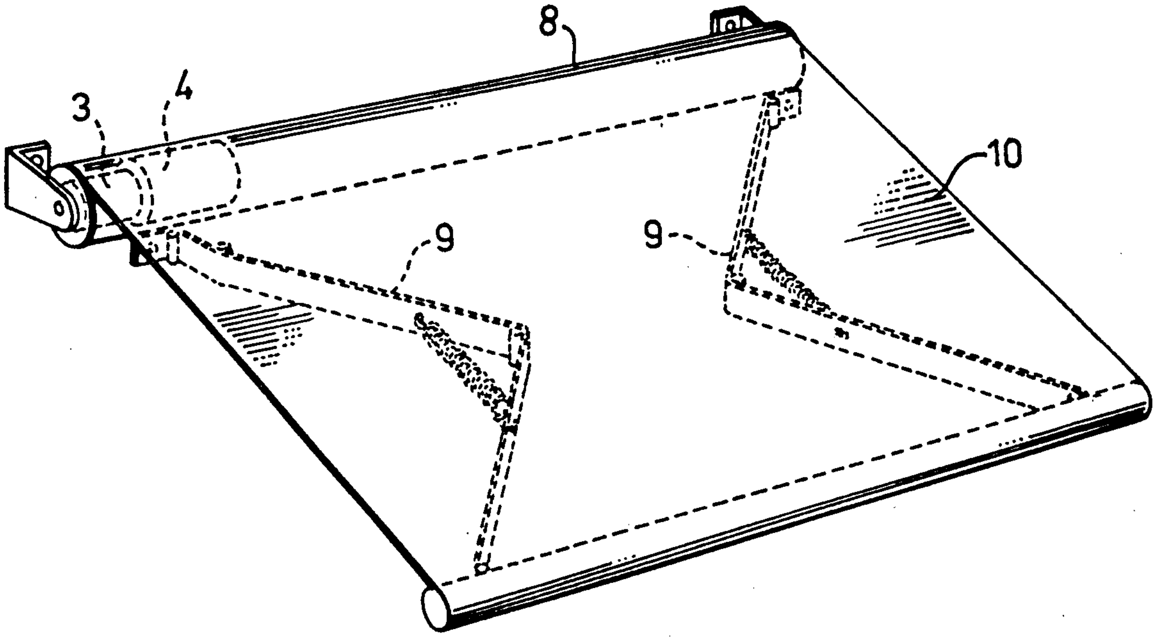
FIG. 5 shows an awning with its motor and gearbox, installed in the winding tube.

In FIG. 5 the construction of an awning is shown. This is similar in design to the roller blind in FIG. 4, however there are spring loaded arms 9, which stretch the awning material 10. There is a motor 3, and gearbox 4, which causes the tube 8 to rotate rolling u the awning material 10.

Figure 6:
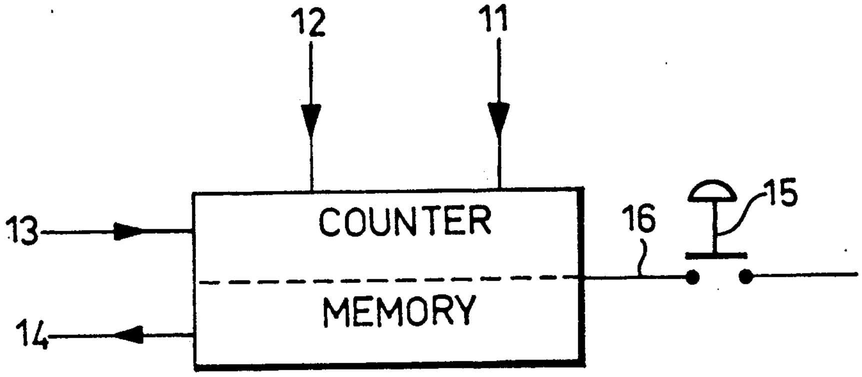
FIG. 6 illustrates a typical digital counting apparatus and the functions that it has.

FIG. 6 illustrates the functions of the digital counter used by the invention. The impulses to the counter are fed to the counter via input 12. A signal telling the counter if impulses are to be added or subtracted, that is if the blind or awning is being let down or being lifted up is given to the counter via input 11. The value on the counter is reset preferably to zero, when at the top position by a signal to input 13. When the value in the counter equals the value in the memory section of the unit then a signal is given via output 14. The value currently in the counter can be transferred to the memory section by manually closing switch 15 on input 16. There are possible alternative combinations of counter units and separate memory units that can be used to achieve the same operative function as described above.

Figure 7:
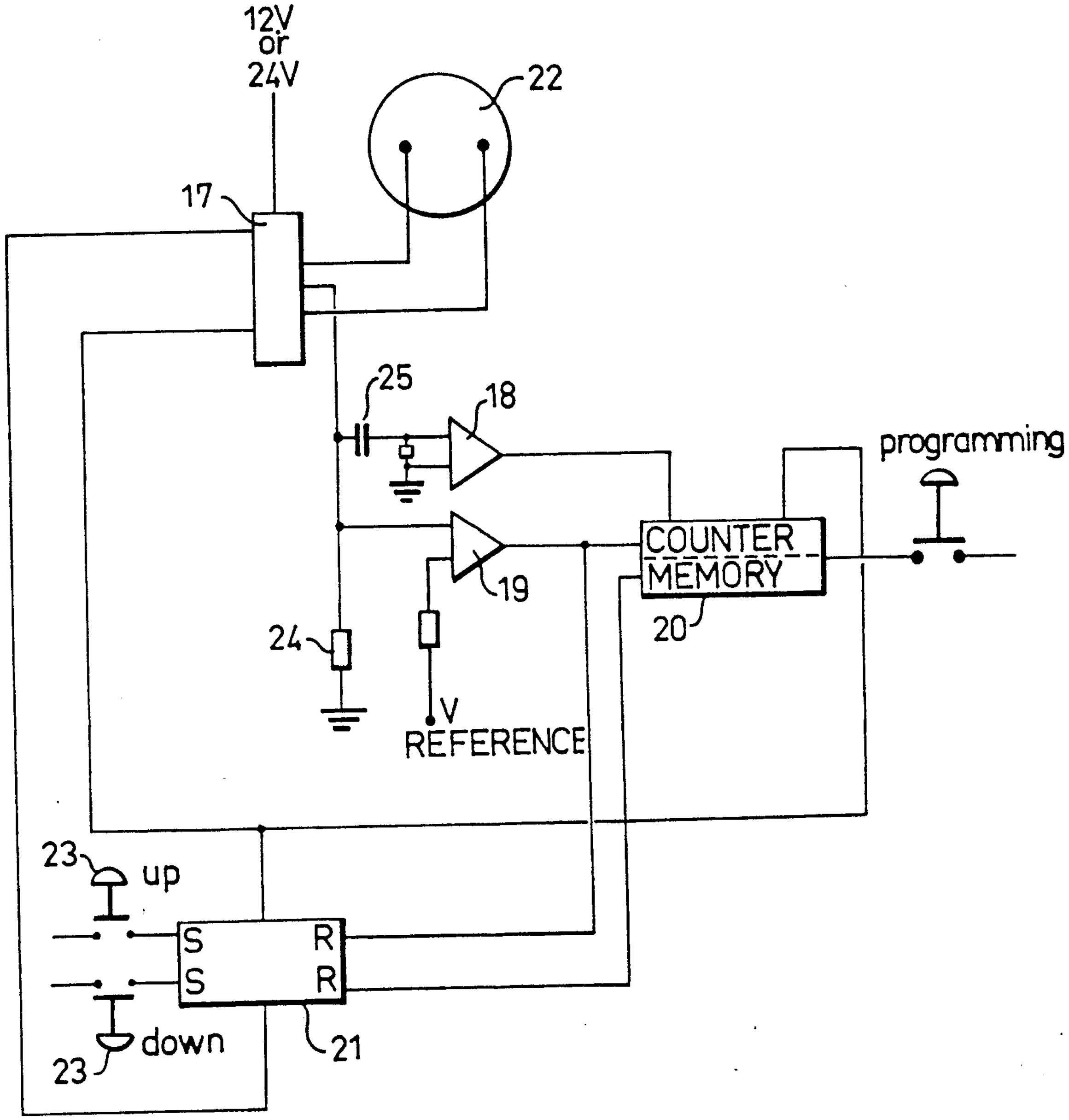
FIG. 7 shows an electrical circuit for controlling the motor which includes the digital counting unit.

FIG. 7 illustrates a typical electric circuit that can be used to detect the pulses induced in the cables leading to includes a counter for counting the induced pulses, a memory that stores the number of pulses required for the blind or awning to move between its end positions, and a comparator circuit for generating a control signal when the operating current to the motor exceeds a predetermined value, and feeding them to the counter unit where they are added or subtracted. Unit 17 is a standard integrated circuit which is used to stop and start the D.C. motor 22. The connection between unit 17 and ground via resistance 24 causes a fluctuating voltage over resistance 24, which is proportional to the fluctuating motor current. This fluctuating voltage is coupled via condensor 25 to an integrated circuit 18 which amplifies the voltage pulses so that they can operate the counter unit 20.

Amplifier 19 compares the fluctuating voltage at resistance 24 with a reference voltage and when this voltage rises above the reference voltage, as will occur when the motor is nearly stopped then the amplifier sends a signal to the counter resetting it to zero. A signal is sent at the same time to switch 21, which stops the motor. Switches 23 are manually operated switches for raising or lowering the blind or awning.

For the small motors used in blind automation there will usually be three pulses for each revolution of the rotor. These pulses, or a proportion of them, are fed to the digital counting apparatus. The pulses are then used to control the blind motor in the following way:

INITIAL SETTING

The blind is raised to its highest position when the counting apparatus is set to zero.

The blind is then run to its lowest position and the sum of the pulses due to the motor's rotation is then stored in a memory. This value is then equivalent to the blind is lowest position.

After this the counter operates in the following way:

OPERATING

When the blind is lowered the pulses due to the motor's rotation are summed up and when the number reaches the number stored in the memory the motor is stopped - the blind having reached its lowest or bottom position.

When the blind is raised the pulses due to motor's rotation are subtracted and when the number of pulses recorded by the counter reaches zero the motor is stopped—the blind having reached its highest or top position.

It can be added that is has been found useful to have another system to check that the blind has reached its top position and not just to rely solely on the pulse counter being zero.

The electric current used by the motor is measured and when the blind is fully raised and can go no further the speed of the motor falls and the current to the motor increases rapidly. When the current has increased over a predetermined value then the blind is at its top position. The motor is then stopped and at the same time a signal is sent to the digital counting apparatus setting it to zero. This method of stopping the blind at its top position is generally preferred. This is because the counting apparatus is zeroed each time the blind is operated and the possibility for wandering of the set top and bottom positions caused, for example, by an accumulation of a small error in the counting of the pulses, is avoided. An additional advantage of zeroing the top position of the blind each time it is raised is that if the lifting cords or bands should stretch with time because of sunshine or because of heat or cold then there is an automatic compensation for this because the blind is always raised to its top position and then lowered a fixed distance, i.e. lowered a fixed number of revolutions of the winding axle or winding reel.

An interesting advantage of the system is that the lifting or lowering of the blind may be stopped in an intermediate position and when the raising or lowering is continued the blind continues to its correct end position. This is because the number of pulses equivalent to the intermediate position is retained in the counter while the blind is stationary and counting continues when the blind moves again.

If the system is used to control an awning instead of a blind then the fully rolled up position of the awning corresponds to the top position of the blind and the fully extended position of the awning corresponds to the fully down position of the blind. The awning has a direct current motor and gearbox installed in the winding tube which causes the tube to rotate. The pulses from the motor as it rotates are fed to a digital counting apparatus and the number of revolutions of the motor thereby known. The counting apparatus is zeroed at the fully rolled up position by measuring the current fed to the motor and setting the counter to zero when the current exceeds a set value. The awning is then fully extended and the sum of the pulses due to the motor's rotation is stored in the memory. This value is used to stop the motor in future operations at the awning's fully extended position.

What is claimed is:

1. An apparatus for controlling a motor used in the lifting and lowering of a window blind or the winding in and out of an awning, said motor being a D.C. motor having a rotor and a stator and being operative to induce pulses in cables connected to said motor due to rotation of said rotor through a magnetic field generated by said stator, said apparatus including signal receiving means connected to said cables for receiving said induced pulses, said signal receiving means including an electrical counter connected to said cables via a ground circuit which includes a resistance and a condenser, said counter being stepped by signals derived form said induced pluses, said signal receiving means further including a memory which stores a number corresponding to the number of pulses that are required for the blind or awning to move between its end positions, said signal receiving means being operative to produce an output signal when the count in said counter and the number stored in said memory indicate that the blind or awning has reached one of its end positions, means responsive to said output signal form said signal receiving means for stopping the motor at said end position of the blind or awning, means connected to said ground circuit for providing a control signal when the operating current to said motor increases over a predetermined value as a result of a decrease in the speed of said motor or a stoppage of said motor due to the blind or awning having reached one of its end positions, and means coupling said control signal to said counter to reset said counter to zero.

2. The apparatus of claim 1 wherein said means for providing said control signal comprises comparator means connected to said resistance in said ground circuit for comparing a voltage generated across said resistance with a reference voltage value.

3. The apparatus of claim 1 wherein said means for providing said control signal comprises comparator means for comparing the operating current to said motor with a reference current value.

* * * * *